US010912003B1

(12) United States Patent
Jupudi et al.

(10) Patent No.: US 10,912,003 B1
(45) Date of Patent: Feb. 2, 2021

(54) SPECTRAL EFFICIENT SELECTION OF STATION CLUSTERS FOR CONCURRENT DATA TRANSMISSIONS IN HIGH EFFICIENCY WLANS (WIRELESS LOCAL ACCESS NETWORKS) USING UNSUPERVISED MACHINE LEARNING MODELS

(71) Applicant: Fortinet, Inc., Sunnyvale, CA (US)

(72) Inventors: Siva Rama Krishna Rao Yogendra Jupudi, Bangalore (IN); Subrahmanyam Bhamidipati, Hyderabad (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/586,189

(22) Filed: Sep. 27, 2019

(51) Int. Cl.
*H04B 7/0452* (2017.01)
*H04W 36/30* (2009.01)
*H04W 24/08* (2009.01)
*H04W 72/08* (2009.01)
*H04L 5/00* (2006.01)
*H04W 36/08* (2009.01)
*H04W 36/00* (2009.01)
*G06N 20/00* (2019.01)
*H04W 88/08* (2009.01)
*H04W 84/12* (2009.01)

(52) U.S. Cl.
CPC .......... *H04W 36/30* (2013.01); *G06N 20/00* (2019.01); *H04B 7/0452* (2013.01); *H04L 5/0007* (2013.01); *H04W 24/08* (2013.01); *H04W 36/0011* (2013.01); *H04W 36/08* (2013.01); *H04W 72/085* (2013.01); *H04W 84/12* (2013.01); *H04W 88/08* (2013.01)

(58) Field of Classification Search
CPC . H04W 36/30; H04W 24/08; H04W 36/0011; H04W 36/08; H04W 72/085; G06N 20/00; H04B 7/0452; H04L 5/0007
See application file for complete search history.

(56) References Cited

U.S. PATENT DOCUMENTS

| | | | | |
|---|---|---|---|---|
| 2009/0285168 A1* | 11/2009 | Choi | ..................... | H04L 5/0042 370/329 |
| 2010/0061469 A1* | 3/2010 | Tao | ..................... | H04L 5/0007 375/260 |
| 2014/0254494 A1* | 9/2014 | Clegg | ..................... | H04B 17/345 370/329 |
| 2016/0119806 A1* | 4/2016 | Carbajal | ..................... | H04B 17/23 455/67.11 |
| 2017/0359819 A1* | 12/2017 | Wang | ..................... | H04L 5/0037 |
| 2019/0364492 A1* | 11/2019 | Azizi | ..................... | H04W 52/0264 |
| 2020/0037392 A1* | 1/2020 | Qui | ..................... | H04W 76/25 |
| 2020/0044764 A1* | 2/2020 | Xu | ..................... | H04L 5/0048 |
| 2020/0195313 A1* | 6/2020 | Black | ..................... | H04B 7/026 |

* cited by examiner

*Primary Examiner* — Syed Ali
(74) *Attorney, Agent, or Firm* — Law Office of Dorian Cartwright; Dorian Cartwright

(57) ABSTRACT

For data packets are received from a plurality of sessions and associated with a plurality of transmitting Wi-Fi stations on the Wi-Fi network. The received data packets contend for access for transmission on the data communication network. Transmitting stations are grouped together when resource units are no longer available. Grouping can implement artificial intelligence such as K-means clustering.

2 Claims, 5 Drawing Sheets

US 10,912,003 B1

SPECTRAL EFFICIENT SELECTION OF STATION CLUSTERS FOR CONCURRENT DATA TRANSMISSIONS IN HIGH EFFICIENCY WLANS (WIRELESS LOCAL ACCESS NETWORKS) USING UNSUPERVISED MACHINE LEARNING MODELS

FIELD OF THE INVENTION

The invention relates generally to computer networking, and more specifically, to improving network hardware performance by selectively clustering WLAN stations for spectrally efficient concurrent data transmissions over a data communication network.

BACKGROUND

High and ultra-high density network throughput are standardized in IEEE 802.11ax, promulgated by the Institute of Electrical and Electronics Engineers.

However, IEEE 802.11ax provides few provisions to improve per-device throughput by incorporating PHY layer, or physical layer, concepts such as OFDMA, MU-MIMO and combinations of both. OFDMA (Orthogonal Frequency Division Multiple Access) is an OFDM based multiple access scheme where users will be allocated different sets of subcarriers for transmission. With use of these different subcarriers for each station, concurrent transmission to multiple stations will be achieved.

Furthermore, real-world traffic, wireless client data length varies with application used and hence we cannot expect all packets from all stations to have uniform data length. Varying lengths lead to varying airtime used for data transmissions across stations. With grouping of stations in OFDMA What is needed is a robust technique for clustering station symbols during concurrent OFDMA data transmissions.

SUMMARY

To meet the above-described needs, methods, computer program products, and systems for clustering station symbols during concurrent OFDMA data transmissions.

In one embodiment, data packets are received from a plurality of sessions and associated with a plurality of transmitting Wi-Fi stations on the Wi-Fi network. The received data packets contend for access for transmission on the data communication network.

In another embodiment, a multivariate lookup table is created of station tuples extracted from the data packets, the station tuples comprising metadata concerning transmission of the data packets. The creating step includes adding a station tuple in the multivariate lookup table for each of the plurality of transmitting Wi-Fi stations in contention for transmission.

In yet another embodiment, symbols are transmitted for the at least two of the selected stations in the concurrent OFDMA data transmission. As shown in FIG. 3A, some symbols can be padded to match the length of the longest symbol.

Advantageously, network performance is improved with better performance towards QoS requirements. Additionally, network computer hardware performance, and network performance, are improved within more efficient processing of network packets.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for clustering station symbols during concurrent OFDMA data transmissions, are described. The techniques can be applied to WMM sessions of network traffic, IEEE 802.11e session of network traffic, and others.

Systems for Clustering Contending Station Transmissions During Concurrent OFDMA Data Transmissions (FIGS. 1-4)

Figure 1:
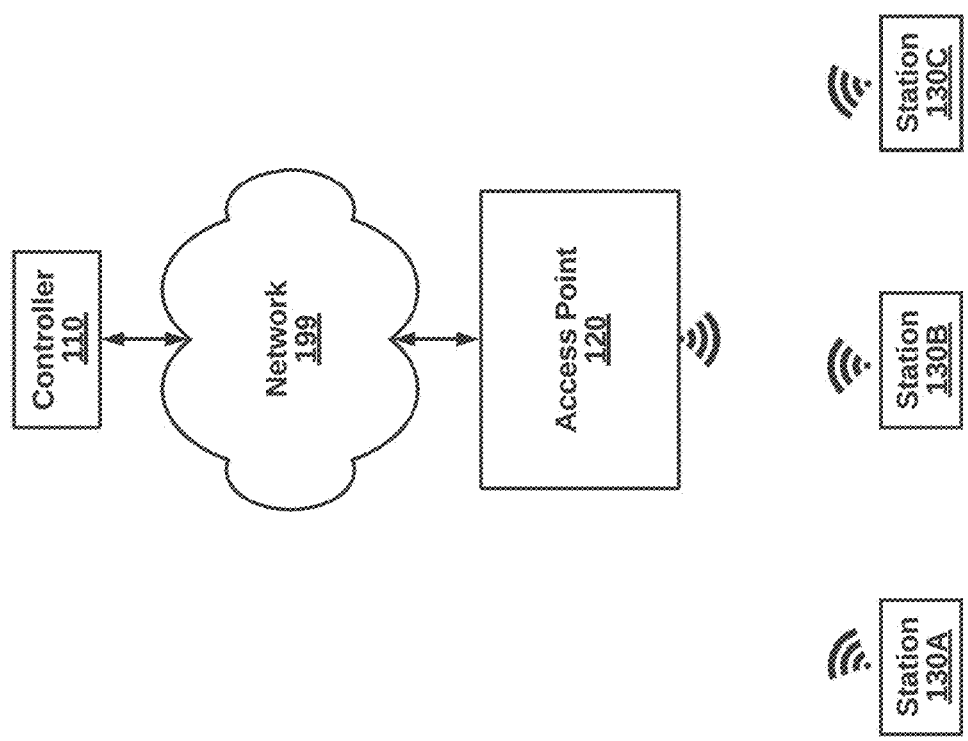
FIG. 1 is a high-level block diagram illustrating a system for clustering station symbols during concurrent OFDMA data transmissions, according to one embodiment.

FIG. 1 is a high-level block diagram illustrating a system for clustering station packets during concurrent OFDMA data transmissions, according to one embodiment. The system 100 includes a Wi-Fi controller 110, access point 120, and stations 130A-C. Other embodiments of the system 100 can include additional network components that are not shown in FIG. 1. For example, there can be more access points and more stations. There can also be network devices such as switches, routers, fire walls, proxy servers, and other network architectures.

In one embodiment, the Wi-Fi controller 110 is preferably connected by wire to the network 199. The access point 120 is also preferably connected by wire to the network 199 and connected wirelessly to the stations 130A-C. The network 199 can comprise a data communication network such as the Internet, WAN (wide area network), VLAN (virtual local access network), a LAN (local access network), a cellular network (e.g., 3G, 4G or 5G), or a hybrid network.

In an embodiment, the access point 120 clusters stations for combined transmitting data packets using K-means clustering. Data packets are received on a communication interface of the access point 120 for Wi-Fi stations on a Wi-Fi network and from network resources on a wide area network. If resources are constrained at the access point for transmissions of received data packets, spectral efficiency can be increased by combining data packets from certain stations. More specifically, clustering is triggered when an amount of transmission resources required for a current load exceeds an amount of transmission resources available at the access point 120. Resource units, also known as RU, ae described in the IEEE 802.11ax specification, incorporated herein by reference. Allocated subcarriers can vary with each data fame in IEEE 802.11ax frames. In some embodiments, there can be up to 16 concurrent station transmissions.

In one embodiment, the access point 120 invokes unsupervised artificial intelligence for grouping contending stations. One example of the access point 120 uses K-means clustering algorithm to optimize grouping. The objective of K-means is to group similar data points together and discover underlying patterns. As a result, a fixed number (k) of clusters in a dataset is determined. The 'k' represents a number of centroids needed in a dataset. The access point 120 gathers data points form tuples. Network data packets include tuples or metadata about the data packet. For example, WMM access category, arrival time, number of IEEE 802.11 symbols, RSSI, and modulation. The WMM access category refers to one of Best Effort, Background, Video and Voice. In some embodiments, the groups must have a common WMM aces category. K-means can be performed on this data for clustering stations.

Figure 6:
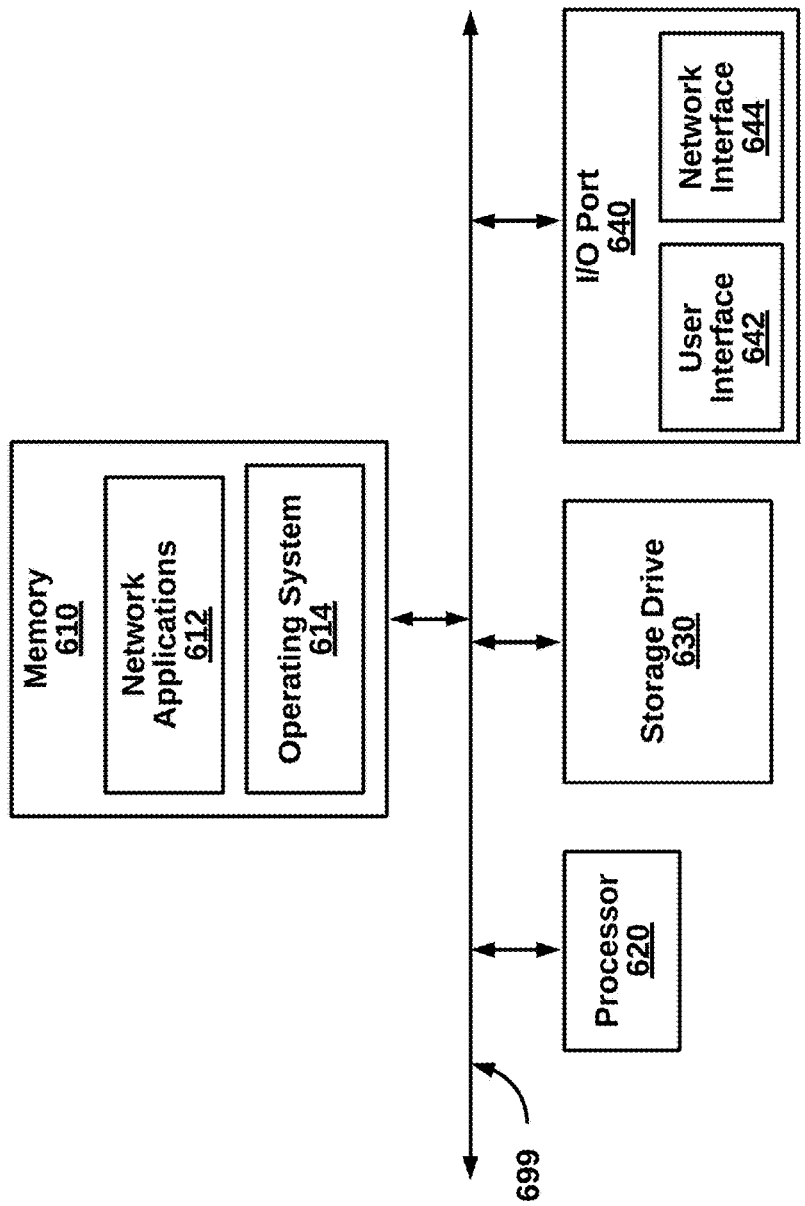
FIG. 6 is a block diagram illustrating an example computing device, according to one embodiment.

The access points 120A-C can be any of the computing devices, such as a personal computer, a server blade, any computing environment as shown in FIG. 6. For example, the AP 101 can be an Access Point—Model 101 or an Access Point—Model 433 (modified as discussed herein) by Fortinet, Inc. The access point 120 is described in more detail in association with FIG. 2.

The Wi-Fi controller 110 is an optional network device that manages multiple access points. Data received from the multiple access points allows the Wi-Fi controller 110 to have a network-wide view of activity. Some decisions are applied by the Wi-Fi controller 110 locally at the access points based on non-local data and non-local parameters. The Wi-Fi controller 110 can also run applications (e.g., SDN or Software-Defined Networking applications). The Wi-Fi controller 110 can be, for example, an MC1500 or MC6000 device by Fortinet, Inc. of Sunnyvale, Calif.

The stations 130A-C (or mobile station, STA, client or wireless device) 102 can be, for example, a personal computer, laptop computer, tablet computer, smart phone, mobile computing device, Internet appliance, end station or any other computing device as described in FIG. 6. The stations 130A-C wirelessly couple to APs using a radio and antenna. No pre-configuration or client is needed. The stations 130A-C operate according to wireless standards such as IEEE 802.11a, b, g, n, ac, w or any other wireless standard. The stations 130A-C can send and receive network packets for applications being executed.

Figure 2:
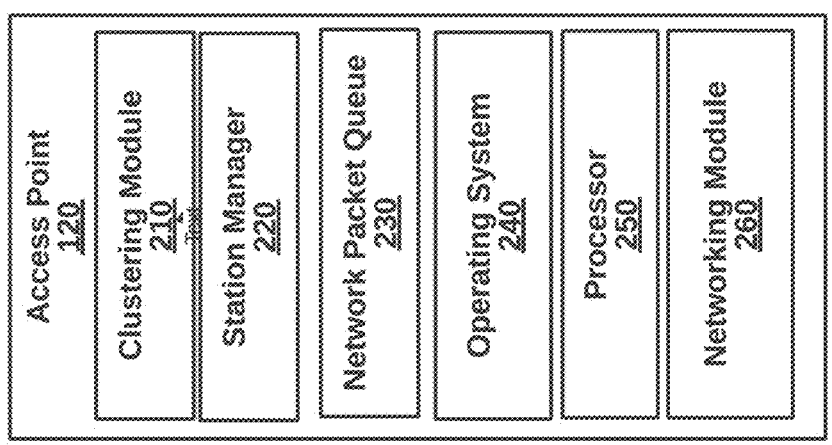
FIG. 2 is a more detailed block diagram illustrating an example access point of the system of FIG. 1, according to one embodiment.

FIG. 2 is a more detailed block diagram illustrating the access point 120 of the system of FIG. 1, according to one embodiment. The access point 120 includes a clustering module 210, an access point management module 220, an operating system 230, and connection ports 240. The components can be implemented in hardware, software, or a combination of both.

The clustering module 210 creates a multivariate lookup table of station tuples extracted from data packets. The station tuples include WMM access category, arrival time, number of IEEE 802.11 symbols, RSSI, and modulation. These tuples can be used to estimate a number of symbols required for the given MPDU/AMPDU.

Figure 3A:
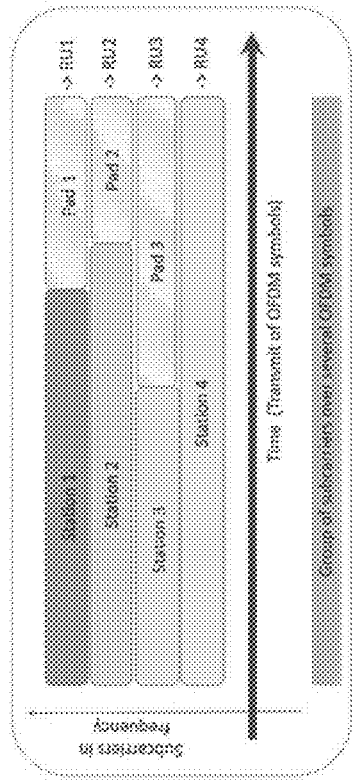
FIGS. 3A & 3B are schematic diagrams of concurrent OFDMA data transmission of PPDU data packets and an example format of a PPDU data packet, according to one embodiment.

FIG. 3A shows an example of a group of stations 1 through 4, each assigned a different subcarrier in frequency. Each of the stations has a different time of transmit for OFDM symbols. A total amount of resource units expended by the access point 120 for transmission for stations 1 through 4 as a group is less than the amount of resource units expended as individual transmissions. This permits the access point 120 to improve hardware performance by processing more packets and by processing packets more quickly.

Figure 3B:
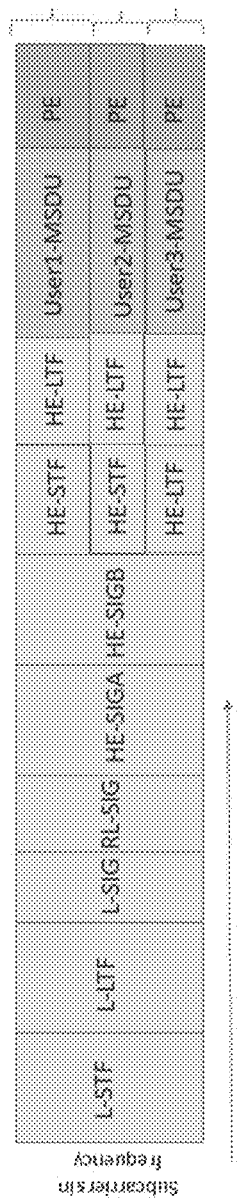

FIG. 3B shows an example of a PPDU format network packet. For instance, a downlink MU-PPDIU format network packet. The PPDU carries the OFDMA frame. Three frames are multiplexed in the frequency domain. Each station can be allocated with resource units for the transmission that are, for example, 26-tone, 52-tone or 106-tone. MSDU is MAC service data unit addressed to a particular user using the station's 6-byte unicast MAC address.

Referring again to FIG. 2, the station management module 220 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 112 to include channel switch announcement information.

The operating system 230 interfaces between the software and hardware of the AP 101. The operating system 114 can also include integrated applications.

The networking module 240 includes connection ports and networking hardware and software for exchanging network packets over the channel.

Figure 5:
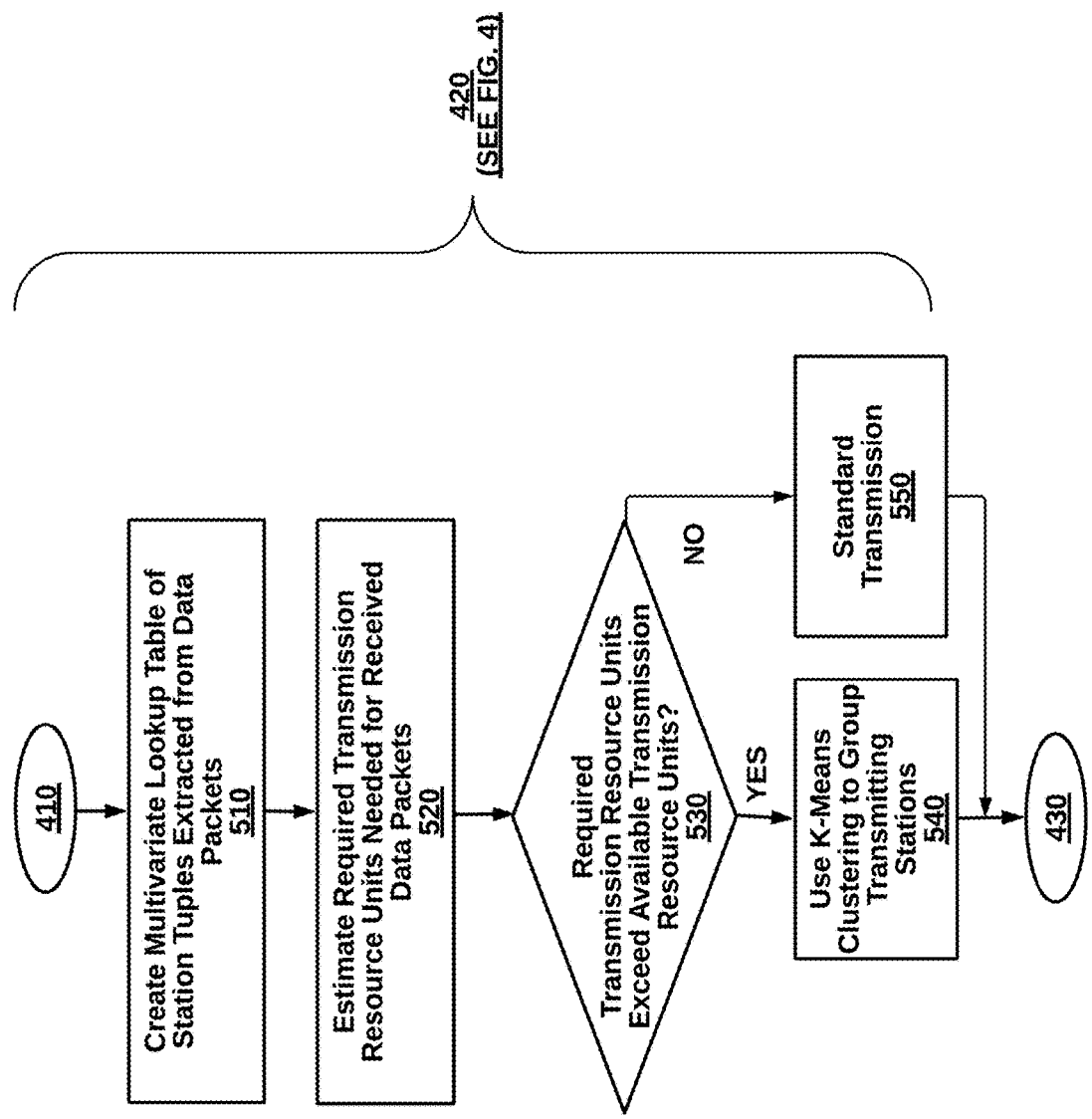
FIG. 5 is a more detailed flow diagram illustrating a step of clustering stations for combined transmissions based on similarity of tuples, from the method of FIG. 4, according to one embodiment.

Methods for Clustering Station Data Packets During Concurrent OFDMA Data Transmissions (FIGS. 5-6)

Figure 4:
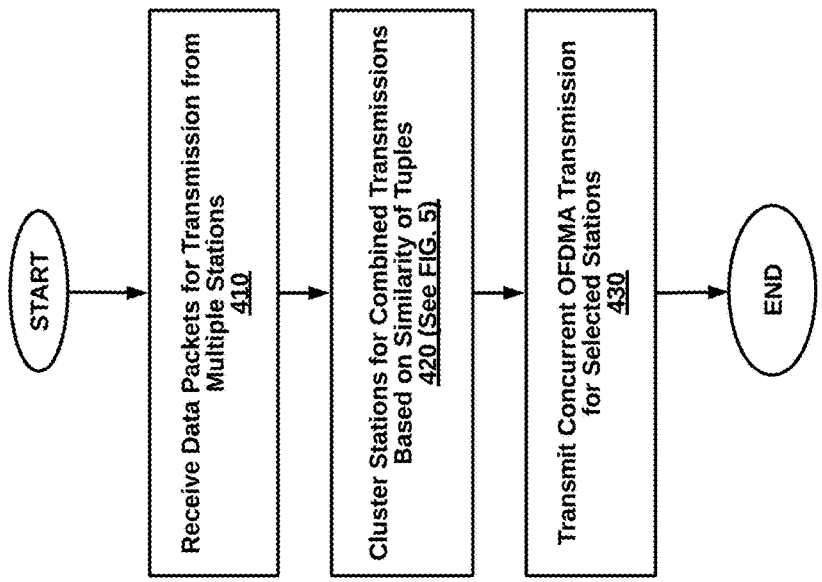
FIG. 4 is a high-level flow diagram illustrating a method for clustering station packets during concurrent OFDMA data transmissions, according to one embodiment.

FIG. 4 is a high-level flow diagram illustrating a method 400 for clustering station data packets during concurrent OFDMA data transmissions, according to one embodiment. The method 400 can be implemented by, for example, the access point 120 of FIG. 1.

At step 410, data packets are received from a plurality of sessions and associated with a plurality of transmitting Wi-Fi stations on the Wi-Fi network. The received data packets contend for access for transmission on the data communication network.

At step 420, stations are selectively clustered for combined transmissions. In one implementation, unsupervised artificial intelligence is implemented with K-means clustering.

At step 430, symbols are transmitted for the at least two of the selected stations in the concurrent OFDMA data transmission. As shown in FIG. 3A, some symbols can be padded to match the length of the longest symbol. In one embodiment, the transmission can be a MU-MIMO (multiple user-multi input multi output) transmission. In another embodiment, the transmission can be a SU-MIMO (single user-multi input multi output) transmission.

FIG. 5 is a more detailed flow diagram illustrating an example of the step 420 of method 400 for clustering station data packets during concurrent OFDMA data transmissions, according to one embodiment.

At step 510, a multivariate lookup table is created of station tuples extracted from the data packets, the station tuples comprising metadata concerning transmission of the data packets. The creating step includes adding a station tuple in the multivariate lookup table for each of the plurality of transmitting Wi-Fi stations in contention for transmission.

At step 520, a required resource units for transmission and other PHY layer parameters for each station tuple transmission are estimated.

At step 530, it is determined whether the estimated required resource units of the access point exceeds available resource units of Wi-Fi stations. Responsive to the estimated required resource units exceeding the available resource units, at step 540, K-means based grouping algorithm is utilized to select at least two of the stations in contention for transmissions for a concurrent OFDMA transmission over different frequencies. The at least two stations are combined into a first transmission group of a plurality of transmission groups based on similarity of tuples.

Alternatively at step 530, if resource units are not exceeded, standard transmission can be implemented by passing k-means clustering, at step 550.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, such as the controller 110, the access point 120, and the stations 130A-C. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network applications 612 and an operating system 614. The network applications 620 can include the modules of network applications or APs as illustrated in FIG. 3. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 602.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 602.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point coupled to a data communication network and coupled to a Wi-Fi network, the method for clustering station packets during concurrent OFDMA (Orthogonal Frequency Division Multiple Access) data transmission to improve spectral efficiency of data transmissions, the method comprising:

receiving data packets of a plurality of sessions and associated with a plurality of transmitting Wi-Fi stations on the Wi-Fi network, the received data packets contending for access for transmission on the data communication network;

creating multivariate lookup table of station tuples extracted from the data packets, the station tuples comprising metadata concerning transmission of the data packets, the creating step comprising adding a station tuple in the multivariate lookup table for each of the plurality of transmitting Wi-Fi stations in contention for transmission, wherein the multivariate lookup table comprises the parameters: modulation type, WMM AC (Wireless Multimedia access category), payload length, arrival time, and RSSI (received signal strength indication);

estimating required resource units for transmission and other PHY layer parameters for each station tuple transmission;

determining whether the estimated required resource units of the access point exceeds available resource units of Wi-Fi stations;

responsive to the estimated required resource units exceeding the available resource units, using K-means based grouping algorithm to select at least two of the stations in contention for transmissions for a concurrent OFDMA transmission over different frequencies, and combining the at least two stations into a first transmission group of a plurality of transmission groups based on similarity of tuples; and transmitting symbols for the at least two of the selected stations in the concurrent OFDMA data transmission.

2. A non-transitory computer-readable medium storing instructions that, when executed by a processor, perform a computer-implemented method in an access point coupled to a data communication network and coupled to a Wi-Fi network, the method for clustering station packets during concurrent OFDMA (Orthogonal Frequency Division Multiple Access) data transmission to improve spectral efficiency of data transmissions, the method comprising:

receiving data packets of a plurality of sessions and associated with a plurality of transmitting Wi-Fi stations on the Wi-Fi network, the received data packets contending for access for transmission on the data communication network;

creating multivariate lookup table of station tuples extracted from the data packets, the station tuples comprising metadata concerning transmission of the data packets, the creating step comprising adding a station tuple in the multivariate lookup table for each of the plurality of transmitting Wi-Fi stations in contention for transmission, wherein the multivariate lookup table comprises the parameters: modulation type, WMM AC (Wireless Multimedia access category), payload length, arrival time, and RSSI (received signal strength indication);

estimating required resource units for transmission and other PHY layer parameters for each station tuple transmission;

determining whether the estimated required resource units of the access point exceeds available resource units of Wi-Fi stations;

responsive to the estimated required resource units exceeding the available resource units, using K-means based grouping algorithm to select at least two of the stations in contention for transmissions for a concurrent OFDMA transmission over different frequencies, and combining the at least two stations into a first transmission group of a plurality of transmission groups based on similarity of tuples; and transmitting symbols for the at least two of the selected stations in the concurrent OFDMA data transmission.

\* \* \* \* \*